(12) United States Patent
Ohsara et al.

(10) Patent No.: US 10,330,031 B2
(45) Date of Patent: Jun. 25, 2019

(54) GAS ENGINE

(71) Applicants: YANMAR CO., LTD., Kita-ku, Osaka-shi, Osaka (JP); JAPAN SHIP MACHINERY AND EQUIPMENT ASSOCIATION, Minato-ku, Tokyo (JP)

(72) Inventors: Tatsuro Ohsara, Osaka (JP); Keiji Matsumoto, Osaka (JP); Osamu Yamagishi, Osaka (JP)

(73) Assignees: YANMAR CO., LTD., Osaka (JP); JAPAN SHIP MACHINERY AND EQUIPMENT ASSOCIATION, Tokyo (JP)

( * ) Notice: Subject to any disclaimer, the term of this patent is extended or adjusted under 35 U.S.C. 154(b) by 86 days.

(21) Appl. No.: 15/113,958

(22) PCT Filed: Jan. 15, 2015

(86) PCT No.: PCT/JP2015/050982
§ 371 (c)(1),
(2) Date: Aug. 31, 2016

(87) PCT Pub. No.: WO2015/111502
PCT Pub. Date: Jul. 30, 2015

(65) Prior Publication Data
US 2016/0369720 A1 Dec. 22, 2016

(30) Foreign Application Priority Data
Jan. 24, 2014 (JP) ................................ 2014-011688

(51) Int. Cl.
*F02D 19/02* (2006.01)
*F02D 41/14* (2006.01)
(Continued)

(52) U.S. Cl.
CPC ......... *F02D 41/0027* (2013.01); *B63H 21/14* (2013.01); *B63H 21/17* (2013.01);
(Continued)

(58) Field of Classification Search
CPC .... F02D 19/02; F02D 19/022; F02D 41/0007; F02D 41/0027; F02D 43/00; F02D 43/12;
(Continued)

(56) References Cited

U.S. PATENT DOCUMENTS

| | | | | |
|---|---|---|---|---|
| 4,953,516 A | * | 9/1990 | van der Weide | .... F02M 21/047 123/442 |
| 5,052,360 A | * | 10/1991 | Ingle, III | ................ F02B 17/00 123/430 |

(Continued)

FOREIGN PATENT DOCUMENTS

| | | |
|---|---|---|
| CN | 102828846 | 12/2012 |
| DE | 11 2012 005503 | 1/2015 |

(Continued)

OTHER PUBLICATIONS

CN 201580005663.5, Office Action dated Feb. 5, 2018, 10 pages—English, 7 pages—Chinese.

(Continued)

*Primary Examiner* — Erick R Solis
(74) *Attorney, Agent, or Firm* — Norton Rose Fulbright US LLP

(57) ABSTRACT

A gas engine is provided that suppresses fluctuation of the actual air-fuel ratio even when a load fluctuates. A gas engine (1) in which at least one opening degree (D) selected from the opening degree of an air supply valve (5a) and the opening degree of a bypass valve (5b) is corrected so that an adequate target air-fuel ratio (λt) is achieved, wherein a target gas pressure (Pgt) and a target gas-jetting time (Tt) of a fuel gas are calculated on the basis of fluctuations of an (Continued)

actual load (L), the gas pressure is corrected on the basis of the target gas pressure (Pgt), and at least one opening degree selected from the opening degree of the air supply valve and the opening degree of the bypass valve is corrected on the basis of the amounts of change in the target gas pressure (Pgt) and the target gas-jetting time.

17 Claims, 8 Drawing Sheets

(51) Int. Cl.

| | | |
|---|---|---|
| *F02D 41/00* | (2006.01) | |
| *F02B 43/00* | (2006.01) | |
| *F02D 29/06* | (2006.01) | |
| *F02B 29/04* | (2006.01) | |
| *F02M 21/02* | (2006.01) | |
| *F02D 23/00* | (2006.01) | |
| *F02B 61/04* | (2006.01) | |
| *B63H 21/14* | (2006.01) | |
| *B63H 21/17* | (2006.01) | |
| *F02M 21/04* | (2006.01) | |
| *F02D 41/34* | (2006.01) | |
| *F02B 37/16* | (2006.01) | |

(52) U.S. Cl.
CPC .......... *F02B 29/0437* (2013.01); *F02B 43/00* (2013.01); *F02B 61/04* (2013.01); *F02D 19/02* (2013.01); *F02D 19/024* (2013.01); *F02D 23/00* (2013.01); *F02D 29/06* (2013.01); *F02D 41/0007* (2013.01); *F02M 21/0215* (2013.01); *F02M 21/0278* (2013.01); *F02M 21/04* (2013.01); *F02B 37/16* (2013.01); *F02D 41/34* (2013.01); *F02D 2041/1412* (2013.01); *F02D 2250/31* (2013.01); *Y02T 10/144* (2013.01); *Y02T 10/146* (2013.01); *Y02T 10/32* (2013.01); *Y02T 70/5218* (2013.01)

(58) Field of Classification Search
CPC ....... F02D 2041/1412; F02D 2043/103; F02D 2043/106; Y02T 10/32; Y02T 10/42
USPC .......................................... 701/103; 123/527
See application file for complete search history.

(56) References Cited

U.S. PATENT DOCUMENTS

| | | | | |
|---|---|---|---|---|
| 7,650,223 | B2 | 1/2010 | Shiraishi et al. | |
| 7,841,322 | B2* | 11/2010 | Bach | F02B 29/0418 |
| | | | | 123/543 |
| 2001/0025218 | A1 | 9/2001 | Shimada et al. | |
| 2002/0019291 | A1 | 2/2002 | Ito | |
| 2011/0195817 | A1 | 8/2011 | Whitney et al. | |
| 2012/0318235 | A1 | 12/2012 | Kaiser et al. | |
| 2015/0101563 | A1* | 4/2015 | Wong | F02D 23/00 |
| | | | | 123/27 GE |
| 2016/0025024 | A1* | 1/2016 | Huber | F02D 19/023 |
| | | | | 123/704 |
| 2016/0040611 | A1* | 2/2016 | Flohr | F02D 19/0642 |
| | | | | 123/528 |
| 2016/0201592 | A1* | 7/2016 | Roecker | F02D 41/0002 |
| | | | | 123/436 |
| 2017/0241353 | A1* | 8/2017 | Young | F02D 19/02 |

FOREIGN PATENT DOCUMENTS

| | | |
|---|---|---|
| EP | 0 992 667 | 4/2000 |
| EP | 1 209 336 | 5/2002 |
| EP | 1 323 913 | 7/2003 |
| JP | 2003-097309 A | 4/2003 |
| JP | 2003-97314 | 4/2003 |
| JP | 2009-057873 | 3/2009 |
| JP | 2009-062936 | 3/2009 |
| JP | 2010-285957 | 12/2010 |
| JP | 2011-47311 | 3/2011 |
| JP | 2013133792 | 7/2013 |
| WO | WO 2013/099094 | 7/2013 |

OTHER PUBLICATIONS

CN 010-633772866, Office Action dated Feb. 5, 2018, 12 pages—English, 7 pages—Chinese.
JP2014-011688, Notification of Reasons for Refusal dated Nov. 28, 2017, 3 pages—English, 4 pages—Japanese.
PCT/JP2015/050982, International Search Report and Written Opinion dated Apr. 21, 2015, 6 pages—Japanese, 7 pages—English.
PCT/JP2015/050982 European International Search Report and Written Opinion dated Sep. 11, 2017, 11 pages—English.
PCT/JP2015/050982 International Search Report and Written Opinion dated Apr. 8, 2015, 8 pages—Japanese; 1 page—English.

* cited by examiner

GAS ENGINE

CROSS REFERENCE TO RELATED APPLICATIONS

This application relates to and claims priority from Ser. No.: PCT/JP2015/050982 filed Jan. 15, 2015, the entire contents of which are incorporated by reference, which in turn claims priority from Ser. No. JP 2014-011688 filed Jan. 24, 2014.

BACKGROUND OF THE INVENTION

Field of the Invention

The present invention relates to a gas engine. More particularly, the present invention relates to a gas engine, a method operation for a gas engine, and a gas engine system for operating a gas engine.

Description of the Related Art

In the related art, a gas engine may use a fuel gas such as natural gas and a fluid gas as fuel, in which a ratio between a flow rate of outside atmospheric air (supply air) and a flow rate of the fuel gas (hereinafter, the ratio will simply be referred to as an "air-fuel ratio") is adjusted so as to achieve an optimum ratio according to properties of the fuel gas to be used, in order to maintain an adequate combustion state and to suppress $NO_x$ or the like contained in an exhaust gas.

In such a gas engine, a target fuel gas flow rate determined from a target rotational speed and power output, and a target air supply amount determined based on the optimum air-fuel ratio are calculated, Then, in the gas engine, a target opening degree of an air supply valve, which serves as a benchmark reference, is calculated from an air supply amount, and a target opening degree of a throttle valve is corrected based on a deviation between the target air supply amount and an actual air supply amount. Such a gas engine is disclosed in, for example, Patent Document 1.

In the technology disclosed in Patent Document 1, a target opening degree of a throttle valve is corrected based on a deviation between a target air supply amount and an actual air supply amount in order to maintain an air-fuel ratio at an adequate value. Consequently, when a load fluctuation occurs, a supply amount of the supply air having a low response speed to an increase in an injection amount of a fuel gas fails to follow the increase in the injection amount of the fuel gas, and the air-fuel ratio fluctuates in some cases.

PRIOR ART DOCUMENT

Patent Document

Patent Document 1: JP-A 2009-57873 Gazette

ASPECTS AND SUMMARY OF THE INVENTION

The present invention is conceived in order to solve such a problem, and an object thereof is to provide a gas engine capable of suppressing a fluctuation of an air-fuel ratio even when a load fluctuation occurs.

Solutions To The Problems

The problem to be solved by the present invention is as described above, and solutions to the problem will be described below.

According to the present invention, in a gas engine in which at least one of an opening degree of an air supply valve and an opening degree of a bypass valve is corrected so as to provide an adequate air-fuel ratio, a target gas pressure and a target gas injection time of a fuel gas are calculated based on a load fluctuation, a gas pressure is corrected based on the target gas pressure, and at least one of the opening degree of the air supply valve and the opening degree of the bypass valve is corrected based on amounts of variations in the target gas pressure and the target gas injection time.

According to the present invention, in a gas engine in which at least one of an opening degree of an air supply valve and an opening degree of a bypass valve is corrected so as to achieve an adequate air-fuel ratio, a target gas pressure is calculated based on a load fluctuation, a gas pressure is corrected based on the target gas pressure, a predicted load after a unit time is calculated based on a load fluctuation pattern in a predetermined period up to the present current times, and at least one of the opening degree of the air supply valve and the opening degree of the bypass valve is corrected based on the predicted load.

According to the present invention, in a gas engine in which at least one of an opening degree of an air supply valve and an opening degree of a bypass valve is corrected so as to provide an adequate air-fuel ratio, a predicted load after a unit time is calculated based on a load fluctuation pattern in a predetermined period up to the present current times, and a target air supply pressure or a target air-fuel ratio is collected based on the predicted load.

According to the present invention, at least one of the opening degree of the air supply valve and the opening degree of the bypass valve is corrected based on a pressure difference between the target air supply pressure and an actual air supply pressure, or a difference between the target air-fuel ratio and an actual air-fuel ratio.

Effects Of The Invention

Since the present invention is configured as described above, the present invention exhibits effects as described below.

According to the present invention, since at least one of an opening degree of an air supply valve and an opening degree of a bypass valve is corrected based on variation in a target gas pressure and a target gas injection time of a fuel gas having a high response speed, a response speed of an air supply pressure improves. Thus, it is possible to suppress a fluctuation of an air-fuel ratio associated with a fluctuation of a load rate.

According to the present invention, since in addition to the correction of at least one of the opening degree of the air supply valve and the opening degree of the bypass valve based on the variations in the target gas pressure and the target gas injection time of the fuel gas having a high response speed, at least one of the opening degree of the air supply valve and the opening degree of the bypass valve is corrected based on a predicted forthcoming load fluctuation, a response speed of an air supply pressure improves. Thus, it is possible to suppress a fluctuation of an air-fuel ratio associated with a load fluctuation.

It will be understood throughout that the phrases speed or rate (when referring to how quickly something occurs) will be understood as being operably the same, so that a 'response rate' and a 'response speed' will be understood as the same.

According to the present invention, since at least one of the opening degree of the air supply valve and the opening degree of the bypass valve is corrected based on the predicted forthcoming load fluctuation, a deviation between a target air supply pressure and an actual air supply pressure reduces. Thus, it is possible to suppress a fluctuation of an air-fuel ratio associated with a load fluctuation The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
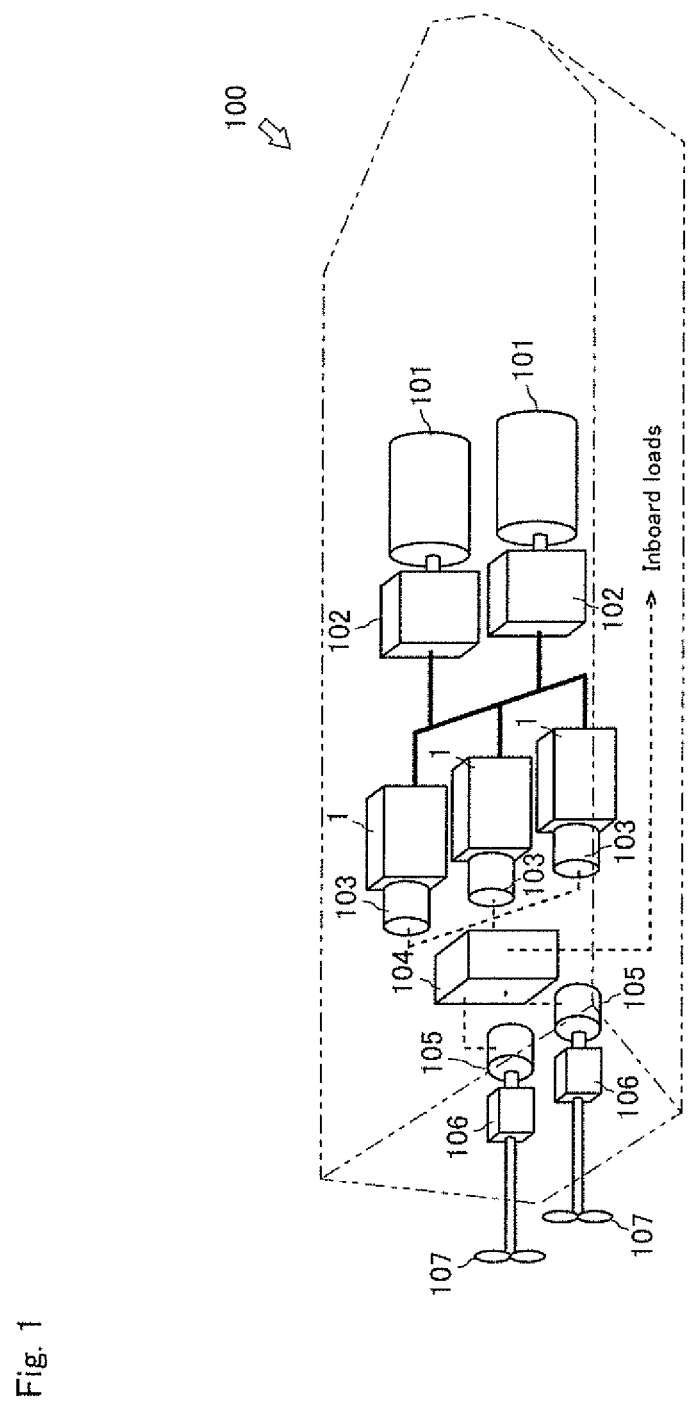
FIG. 1 is a schematic view showing a configuration of an electric propulsion ship mounting gas engines according to an embodiment of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of descriptions.

First, with reference to FIG. 1, an electric propulsion ship 100 will be described, which is an embodiment of a ship that has gas engines 1 according to the present invention mounted thereon and including superchargers, respectively. Further, FIG. 1 schematically shows a configuration of the electric propulsion ship 100.

As shown in FIG. 1, the electric propulsion ship 100 has the gas engines 1 according to the embodiment. The electric propulsion ship 100 includes LNG tanks 101, vaporizers 102, the gas engines 1, electric generators 103, a power control board 104, propulsion motors 105, reducers 106, and adjustable pitch-propellers 107.

In the electric propulsion ship 100, a fuel gas stored in the LNG tanks 101, 101 is mixed with air by the vaporizers 102, 102, and is supplied to the gas engines 1,1,1. Then, the electric generators 103, 103, 103 are driven by the gas engines 1,1,1, and power is supplied to the propulsion motors 105, 105 and inboard loads by the power control board 104. The drive of the propulsion motors 105, 105 is transmitted to the adjustable pitch-propellers 107, 107 via the reducers 106, 106.

Herein, each of the gas engine 1 includes gas engines 1 that are gas engines using fuel gas such as natural gas as a fuel. Further, although a main power generation system of the electric propulsion ship is the gas engine in the present embodiment, the usage of the gas engine is not limited thereto, and the gas engine may be used as a main machine or an auxiliary machine in a ship that drives a propeller by an engine.

Next, a gas engine 1 according to a first embodiment of the gas engine according to the present invention will be described with reference to FIG. 2. Further, an "upstream side" in the present embodiment indicates an upstream side in the flowing direction of gas and air mixture, and a "downstream side" in the present embodiment indicates the downstream side in the flowing direction of gas and air mixture.

Figure 2:
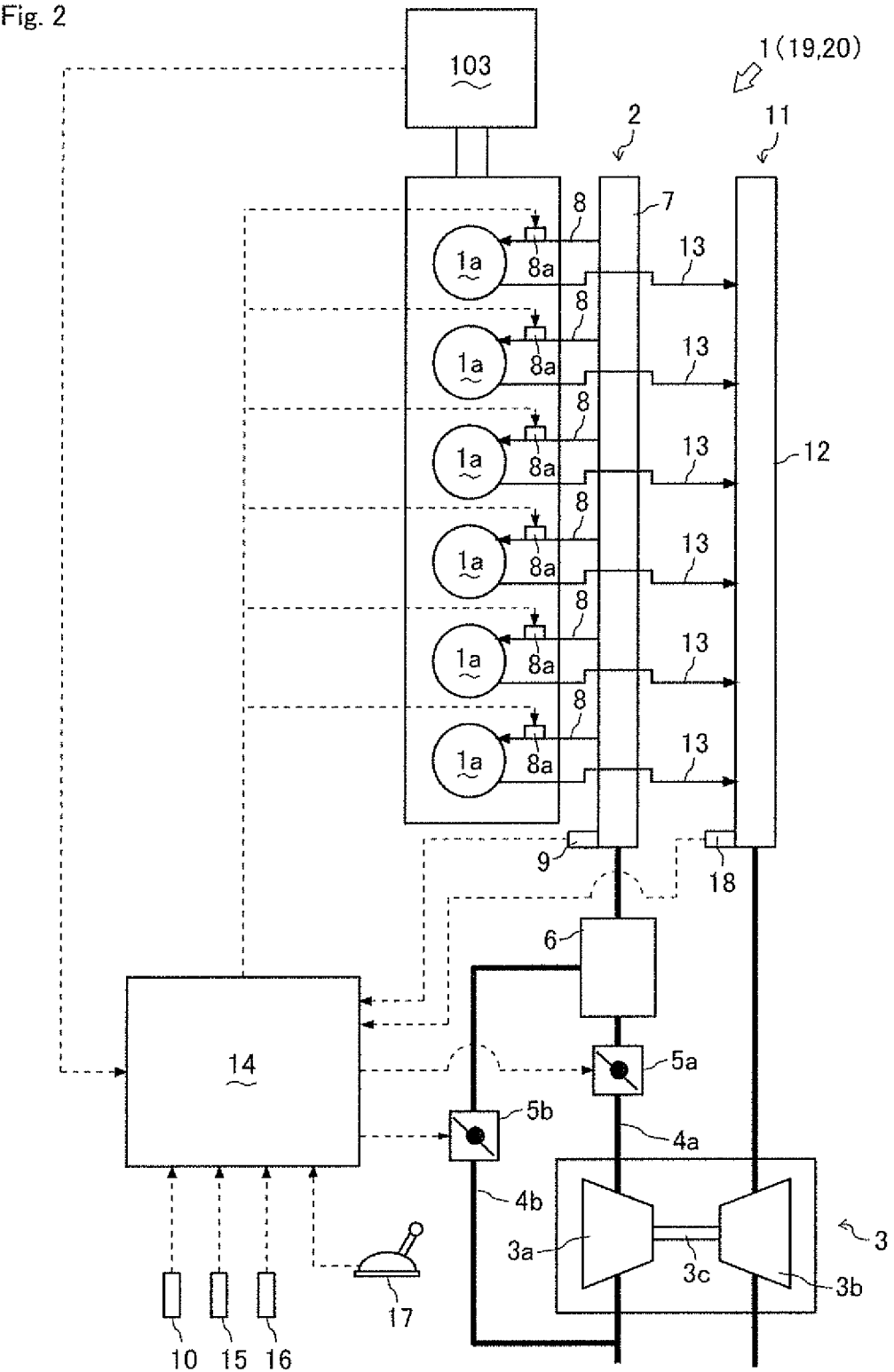
FIG. 2 is a schematic view showing a configuration of the gas engine and a supercharger according to a first embodiment of the present invention.

As shown in FIG. 2, the gas engine 1 is a single cylinder engine or a multi-cylinder engine, and uses fuel gas such as natural gas as fuel. The gas engine 1 according to the present embodiment is mainly a straight-six-cylinder engine having six cylinders 1a. Further, in the embodiment, the gas engine 1 is the straight-six-cylinder engine equipped with a one-stage supercharger, but the gas engine 1 is not limited thereto as long as it is a multi-cylinder engine equipped with at least one or more supercharger.

The gas engine 1 rotates and drives an output shaft by mixing and combusting atmospheric air and fuel gas inside each cylinder 1a. The gas engine 1 is equipped with an air intake device 2 that takes atmospheric air in, an air exhaust device 11 that discharges exhaust air to the outside, and an ECU 14 that is a control device. The gas engine 1 connects to the electric generators 103 (see FIG. 1), of which the power output shaft (not shown in FIG.) is a load device.

The air intake device 2 is equipped with a compressor unit 3a of a supercharger 3, an air supply pipe 4a, an air supply valve 5a, a bypass valve 5b, an intercooler 6, and an air supply manifold 7.

The supercharger 3 pressurizes and compresses intake air, using an exhaust pressure of exhaust air as a driving source. The supercharger 3 includes the compressor unit 3a and a turbine unit 3b.

The compressor unit 3a of the supercharger 3 pressurizes and compresses intake air. The compressor unit 3a is coupled to the turbine unit 3b with a connecting shaft 3c. The compressor unit 3a is configured such that rotational power from the turbine unit 3b can be transmitted via the connecting shaft 3*c*. The intercooler 6 is coupled to the compressor unit 3*a* via the air supply pipe 4*a*. Hereinafter, the pressurized intake-air after the pressurization and compression by the compressor unit 3*a* is referred to as supply air.

The air supply valve 5*a* changes a flow rate of the supply air (air supply amount). The air supply pipe 4*a* includes the air supply valve 5*a*. The air supply valve 5*a* is provided in the air supply pipe 4*a* on the downstream side of the compressor unit 3*a* of the supercharger 3 and on the upstream side of the intercooler 6. Specifically, the air supply valve 5*a* is provided between the compressor unit 3*a* and the intercooler 6. The air supply valve 5*a* includes an automatic valve that is openable and closable by an actuator such as an electronic motor. The air supply valve 5*a* can change the air supply amount to be supplied to the gas engine 1 by adjusting an opening degree D thereof.

The bypass valve 5*b* reduces the air supply amount. The bypass valve 5*b* is provided in a bypass pipe 4*b* that connects the upstream side of the compressor unit 3*a* of the supercharger 3 and the intercooler 6. Specifically, the air supply valve 5*a* can discharge the supply air supplied to the intercooler 6 to the upstream side of the compressor unit 3*a*. The bypass valve 5*b* includes an automatic valve that is openable and closable by an actuator such as an electronic motor. The bypass valve 5*b* can discharge the supply air from the intercooler 6 and change the air supply amount to be supplied to the gas engine 1 by adjusting an opening degree thereof.

The intercooler 6 cools the pressurized supply air. The intercooler 6 cools the supply air by exchanging heat between cooling water supplied by a cooling water pump (not shown) and the pressurized supply air. The air supply manifold 7 is connected to the intercooler 6.

The air supply manifold 7 distributes the supply air to each cylinder 1*a* of the engine 1. The air supply manifold 7 is connected to each cylinder 1*a* of the gas engine 1 via corresponding one of air supply ports 8. Specifically, the air supply manifold 7 is configured such that the supply air cooled by the intercooler 6 can be supplied to each cylinder 1*a* of the gas engine 1. Moreover, the air supply manifold 7 is provided with an air supply pressure sensor 9 that senses an actual air supply pressure Pi.

Each of the air supply ports 8 is provided with a gas injector 8*a* that injects fuel gas. A regulator 10 that is a pressure regulating valve controlling a fuel gas pressure is provided in a fuel gas supplying path (not shown) that supplies fuel gas to each gas injector 8*a*.

The air exhaust device 11 discharges exhaust air from the gas engine 1 to the outside. The air exhaust device 11 comprises an air exhaust manifold 12 and the turbine unit 3*b* of the supercharger 3.

The air exhaust manifold 12 collects exhaust air from each cylinder 1a. The air exhaust manifold 12 is connected to each cylinder 1*a* of the gas engine 1 via corresponding one of air exhaust port 13. The air exhaust manifold 12 has another side end portion connected to the supercharger 3. Moreover, the air exhaust manifold 12 is provided with an air-fuel ratio sensor (oxygen sensor) (not shown) that detects a residual oxygen amount O (not shown in FIG.) in the exhaust air, which is used for calculating an actual air-fuel ratio $\lambda$.

The turbine unit 3*b* of the supercharger 3 generates rotational power by the pressure of the exhaust air. The turbine unit 3*b* is coupled with the compressor unit 3*a* by the connecting shaft 3*c*, and is configured such that the rotational power can be transmitted to the compressor unit 3*a*.

The air exhaust manifold 12 is connected to the turbine unit 3*b*. Moreover, the turbine unit 3*b* communicates with the outside via a purification system (not shown in FIG.) or the like.

As described above, the compressor unit 3*a* of the supercharger 3, the air supply pipe 4*a*, the intercooler 6, and the air supply manifold 7 are connected to the air intake device 2 in order from the upstream side (outside). Moreover, the air exhaust manifold 12, the turbine unit 3*b* of the supercharger 3, an exhaust pipe (not shown in FIG.), and the like are connected to the air exhaust device 11 in order from the upstream side (the gas engine 1).

The ECU 14 that is a control device controls operation of the gas engine 1. The ECU 14 stores various programs for controlling the gas engine 1, and data such as a target rotational speed map M1 (not shown in FIG.), a target air supply pressure map M2, a target gas differential pressure map M3, a reference opening degree map M4, and a first opening degree correction map M5. Here, the gas pressure difference means a pressure difference between the actual air supply pressure Pi and a target gas pressure Pgt. Note that in the following embodiment, the ECU 14 stores a variety of maps and is configured to perform the control based on these maps, but the configuration of the ECU 14 is not limited thereto. For example, the ECU 14 may be configured to calculate each value by an arithmetic expression instead of the maps. The ECU 14 may be configured such that a CPU, a ROM, a RAM, an HDD or the like is connected in a bus, or may be configured to include one chip LSI or the like.

The ECU 14 is connected to the air supply valve 5*a* and the bypass valve 5*b*, and the ECU 14 can change the actual air supply pressure Pi by controlling the opening degree D of the air supply valve 5*a*. That is, the ECU 14 can change the air supply amount to be supplied to the gas engine 1 by controlling the opening degree D of the air supply valve 5*a* (and/or the opening degree of the bypass valve 5*b*).

The ECU 14 is connected to each gas injector 8*a*, and can change a fuel gas injection time T of the gas injector 8*a*. That is, the ECU 14 can stop operation of the gas engine 1 and change a fuel gas amount by changing the fuel gas injection time by the gas injector 8*a*.

The ECU 14 is connected to the regulator 10, and can change a set pressure Pr of the fuel gas pressure of the regulator 10. That is, the ECU 14 can change the fuel gas amount to be supplied to the gas engine 1 by controlling the set pressure Pr of the regulator 10.

The ECU 14 is connected to the air supply pressure sensor 9, and can acquire the actual air supply pressure Pi detected by the air supply pressure sensor 9.

The ECU 14 is connected to a gas pressure sensor 15, and can acquire an actual gas pressure Pg (not shown in FIG.) detected by the gas pressure sensor 15.

The ECU 14 is connected to a rotational speed detection sensor 16, and can acquire an actual rotational speed N of the gas engine 1 detected by the rotational speed detection sensor 16.

The ECU 14 is connected to an accelerator lever 17 commanding an application of a load, and can acquire a command value C from the accelerator lever 17.

The ECU 14 is connected to the air-fuel ratio sensor (not shown in FIG.), and can acquire the residual oxygen amount O in the exhaust air detected by the air-fuel ratio sensor.

The ECU 14 is connected to the electric generator 103, and can acquire an actual load L, based on a power signal from the electric generator 103.

The ECU 14 can calculate a target rotational speed Nt, based on the target rotational speed map M1 and from the command value C from the accelerator lever 17.

The ECU 14 can calculate a target air supply pressure Pit, based on the acquired actual load L, a lubricant oil temperature acquired from a lubricant oil temperature sensor (not shown in FIG.), a supply air temperature acquired from a supply air temperature sensor (not shown in FIG.), or the like.

The ECU 14 can calculate a target gas differential pressure Pgdt, based on the target gas pressure difference map M3 and from the acquired actual load L.

The ECU 14 can calculate a target gas injection time Tt of the gas injector 8a from the acquired actual rotational speed N and the calculated target rotational speedNt.

The ECU 14 can calculate a reference opening degree D0 of the air supply valve 5a (or at least one of the air supply valve 5a and the bypass valve 5b), based on the reference opening degree map M4 and from a deviation between the acquired actual air supply pressure Pi and the calculated target air supply pressure Pit.

The ECU 14 can calculate a first corrected opening degree ΔD1 of at least either one of the air supply valve 5a or the bypass valve 5b, based on the first opening degree correction map M5 and from amounts of change in the acquired target gas pressure difference Pgdt and the target gas injection time Tt.

The ECU 14 can calculate the target gas pressure Pgt from the acquired actual air supply pressure Pi and the calculated target gas pressure difference Pgdt.

The ECU 14 can change the injection time T of the gas injector 8a to the calculated target gas injection time Tt.

The ECU 14 can calculate a target air-fuel ratio λt, based on a target air-fuel ratio map (not shown in FIG.) and from the acquired actual load L.

The ECU 14 can calculate the actual air-fuel ratio λ from the acquired residual oxygen amount O.

The ECU 14 can change the current set pressure Pr of the regulator 10 to the calculated target gas pressure Pgt.

The ECU 14 can calculate the opening degree D of at least either one of the air supply valve 5a or the bypass valve 5b as D=D0+ΔD1, from the calculated reference opening degree D0 and the calculated first corrected opening degree ΔD1.

Next, flow of intake-air in the air intake device 2 and flow of exhaust air in the air exhaust device 11 will be described with reference to FIG. 2. Further, in the following embodiment, the air intake device 2 is basically configured such that the opening degree of at least either one of the air supply valve 5a or the bypass valve 5b is corrected based on the pressure difference between the target air supply pressure Pit and the actual air supply pressure Pi, but the air intake device 2 may be configured such that the opening degree is corrected based on a difference between the target air-fuel ratio λt and the actual air-fuel ratio λ.

As shown in FIG. 2, in the air intake device 2, outside air (intake air) is suctioned, pressurized and compressed by the compressor unit 3a of the supercharger 3. At this time, compression heat is generated by the pressurization and compression of the intake-air, and a temperature of the intake-air increases. The supply air pressurized and compressed by the compressor unit 3a is discharged from the supercharger 3.

The supply air discharged from the supercharger 3 is supplied to the intercooler 6 via the air supply pipe 4a at a flow rate adjusted by at least either one of the air supply valve 5a or the bypass valve 5b. The supply air supplied to the intercooler 6 is cooled and thereafter supplied to the air supply manifold 7. Moreover, depending on a control mode of the gas engine 1, some of the supply air supplied to the intercooler 6 is supplied to the supercharger 3 via the bypass pipe 4b at a flow rate adjusted by the bypass valve 5b.

The supply air supplied to the air supply manifold 7 is supplied to each cylinder 1a of the gas engine 1 via each air supply port 8, At this time, a fuel gas is injected from the gas injector 8a equipped in each air supply port 8, based on the target air supply pressure Pit.

In the air exhaust device 11, the exhaust air from the gas engine 1 is supplied to the turbine unit 3b of the supercharger 3 via the air exhaust manifold 8 and the air exhaust manifold 12. The turbine unit 3b is rotated by the exhaust air. Rotational power of the turbine unit 3b is transmitted to the compressor unit 3a via the connecting shaft 3c. The exhaust air supplied to the turbine unit 3b is discharged outside via a purification system (not shown in FIG.) or the like.

Next, air-fuel ratio control by the ECU 14 of the gas engine 1 according to the present invention will be described with reference to FIGS. 3 and 4.

Figure 3:
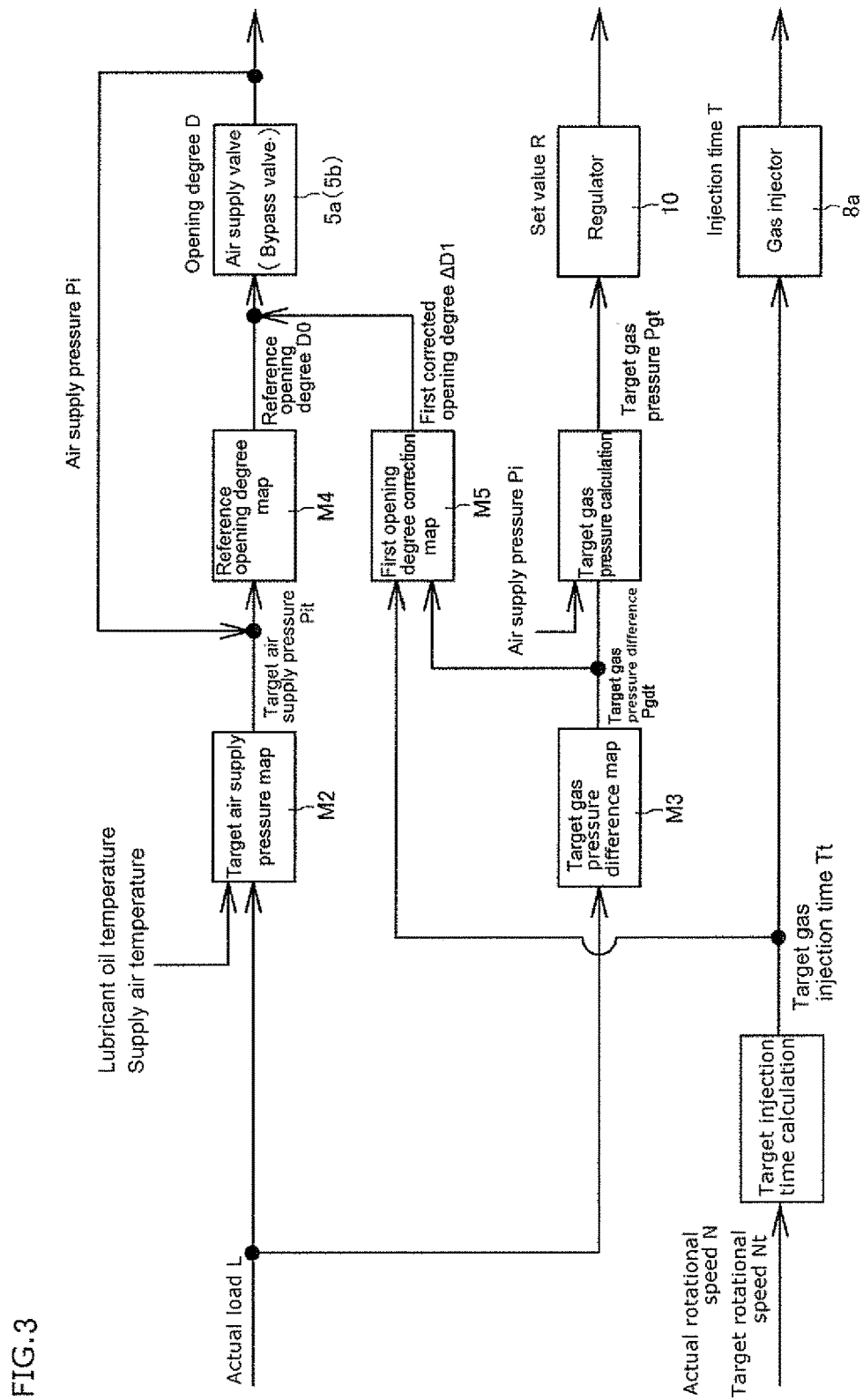
FIG. 3 is a block diagram showing a control mode of air-fuel ratio control of the gas engine according to the first embodiment of the present invention.

As shown in FIG. 3, the ECU 14 calculates the target air supply pressure Pit from the actual load L. Next, the ECU 14 calculates the reference opening degree D0 from the deviation between the target air supply pressure Pit and the actual air supply pressure Pi. At the same time, the ECU 14 calculates the first corrected opening degree ΔD1 from the amounts of change in the target gas pressure difference Pgdt and the target gas injection time Tt. Then, the ECU 14 changes the opening degree D of at least either one of the air supply valve 5a or the bypass valve 5b on the basis of the reference opening degree D0 and the first corrected opening degree ΔD1. Specifically, the ECU 14 corrects the air supply amount. On the other hand, the ECU 14 changes the set pressure Pr of the regulator 10 to the target gas pressure Pgt, and changes the injection time T of the gas injector 8a to the target gas injection time Tt.

Hereinafter, a control mode of the air-fuel ratio control by the ECU 14 will be described specifically with reference to FIG. 4.

Figure 4:
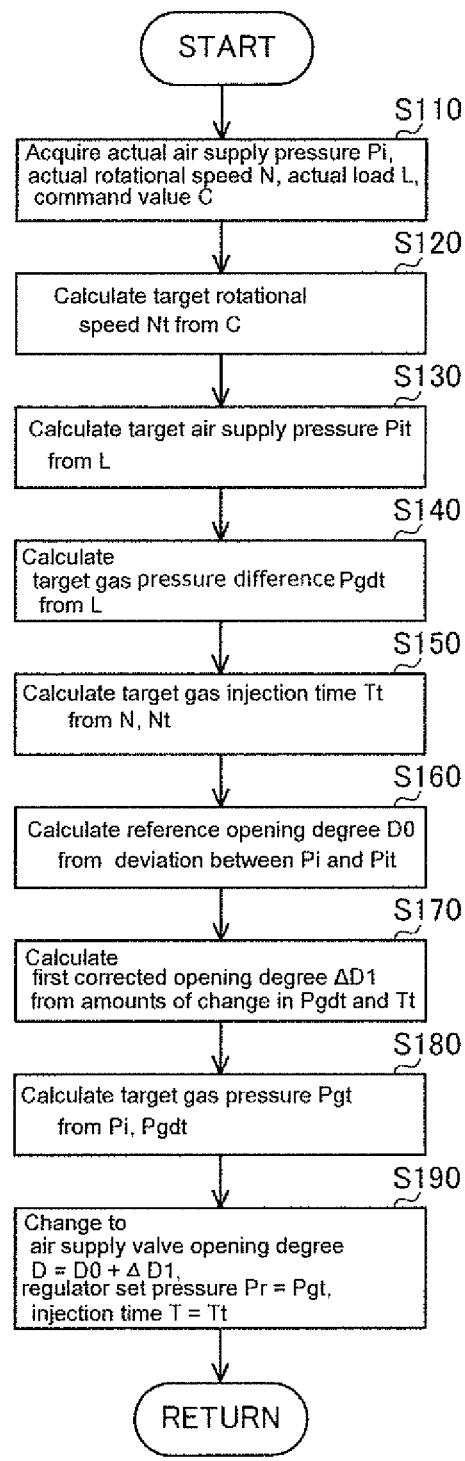
FIG. 4 is a flow chart showing the control mode of air-fuel ratio control of the gas engine according to the first embodiment of the present invention.

As shown in FIG. 4, in the step S110. the ECU 14 acquires the actual air supply pressure Pi detected by the air supply pressure sensor 9, the actual rotational speed N of the gas engine 1 detected by the rotational speed (or rotational rate) detection sensor 16, the actual load L detected by the electric generator 103, and the command value C from the accelerator lever 17, and the step proceeds to the step S120.

In the step S120, the ECU 14 calculates the target rotational speed Nt from the acquired command value C, and the step proceeds to the step S130.

In the step S130, the ECU 14 calculates the target air supply pressure Pit from the acquired actual load L. and the step proceeds to the step S140.

In the step S140, the ECU 14 calculates the target gas pressure difference Pgdt from the acquired actual load L, and the step proceeds to the step S150.

In the step S150, the ECU 14 calculates the target gas injection time Tt from the acquired actual rotational speed N and the calculated target rotational speed Nt, and the step proceeds to the step S160.

In the step S160, the ECU 14 calculates the reference opening degree D0 from the deviation between the acquired actual air supply pressure Pi and the calculated target air supply pressure Pit, and the step proceeds to the step S170.

In the step S170, the ECU 14 calculates the first corrected opening degree ΔD1 from the amounts of change in the calculated target gas pressure difference Pgdt and the calculated target gas injection time Tt, and the step proceeds to the step S180.

In the step S180, the ECU 14 calculates the target gas pressure Pgt from the acquired actual air supply pressure Pi and the calculated target gas pressure difference Pgdt, and the step proceeds to the step S190.

In the step S190, the ECU 14 changes the opening degree D of at least either one of the air supply valve 5a or the bypass valve 5b to D=D0+ΔD1 on the basis of the calculated reference opening degree D0 and the first corrected opening degree ΔD1, changes the set pressure Pr of the regulator 10 to the target gas pressure Pgt on the basis of the calculated target gas pressure Pgt, and changes the injection time T of the gas injector 8a to the target gas injection time Tt on the basis of the calculated target gas injection time Tt, and the step proceeds to the step S110.

In the gas engine 1 configured as described above, the opening degree D of at least either one of the air supply valve 5a or the bypass valve 5b is changed based on the reference opening degree D0 calculated from the deviation between the actual air supply pressure Pi and the target air supply pressure Pit, and based on the first corrected opening degree ΔD1 calculated from the amounts of change in the target gas pressure difference Pgdt and the target gas injection time Tt. Specifically, in the gas engine 1, since the opening degree D of the air supply valve, i.e., the air supply amount is corrected based on the changes in the target gas pressure difference Pgdt and the target gas injection time Tt of a fuel gas having a high response speed, a response speed of the actual air supply pressure Pi improves. Thus, it is possible to suppress a fluctuation of the actual air-fuel ratio λ associated with a fluctuation of the actual load L.

Next, a gas engine 19 that is a second embodiment of the gas engine according to the present invention will be described with reference to FIGS. 5 and 6. Further, in the following embodiment, specific description related to points similar to the description in the embodiment described above will be omitted, and different points will be described mainly.

An ECU 14 stores a variety of programs for controlling a gas engine 19, and data such as a load prediction map M6, a predicted target injection map M7, and a second opening degree correction map M8.

The ECU 14 can select one approximate load fluctuation pattern from data accumulated in a certain period of a calculated target rotational speed Nt and a calculated actual load L, based on the load prediction map M6 including a plurality of load fluctuation patterns preliminarily set by experiments and measurement, and can calculate and predict load Lp after a predetermined time, based on the selected load fluctuation pattern. Further, in the present embodiment, the ECU 14 is configured to select the approximate one load fluctuation pattern from a plurality of load fluctuation patterns preliminarily set by experiments and measurement, but the configuration of the ECU 14 is not limited thereto. For example, the ECU 14 may be configured to calculate a load pattern from an actual load and to calculate the predicted load Lp after a predetermined time, based on the calculated load fluctuation pattern.

The ECU 14 can calculate a predicted target injection time Tp, based on the predicted target injection map M7 and from the predicted load Lp, and can calculate a predicted target gas pressure difference Pgpdt that is a corrected value of a target gas pressure difference Pgdt by the predicted load Lp, based on a target gas pressure difference map M3 and from the predicted load Lp.

The ECU 14 can calculate a second corrected opening degree λD2 of at least either one of the air supply valve 5a or a bypass valve 5b in view of a load fluctuation assumed after a predetermined time based on the second opening degree correction map M8 and from the calculated predicted target injection time Tp and the predicted target gas pressure difference Pgpdt.

The ECU 14 can calculate an opening degree D of at least either one of the air supply valve 5a or the bypass valve 5b as D=D0+ΔD2, from the calculated reference opening degree D0 and the calculated second corrected opening degree ΔD2.

Next, air-fuel ratio control by the ECU 14 of the gas engine 19 according to the present invention will described with reference to FIGS. 5 and 6.

Figure 5:
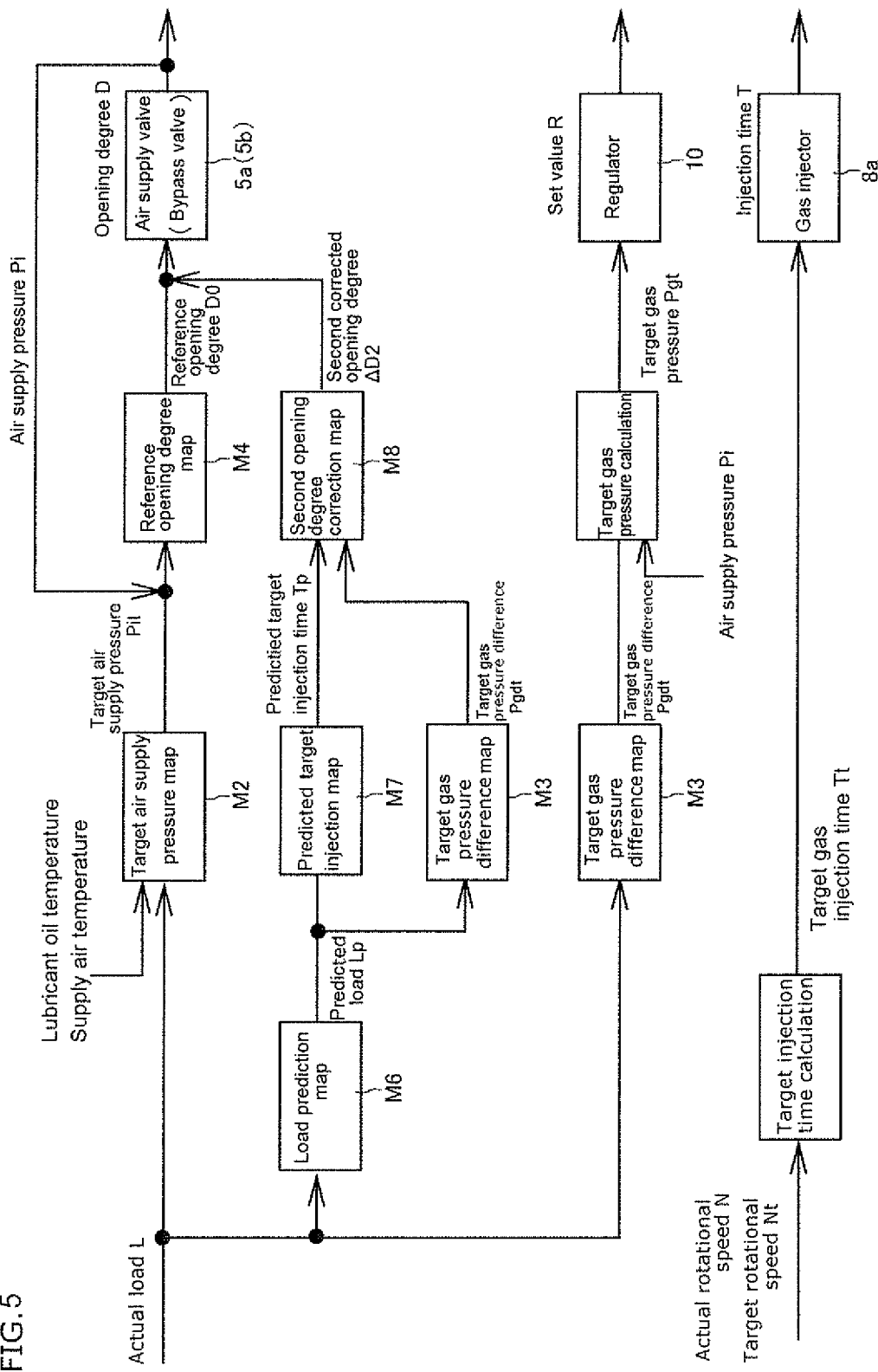
FIG. 5 is a block diagram showing a control mode of air-fuel ratio control of a gas engine according to a second embodiment of the present invention.
Figure 6:
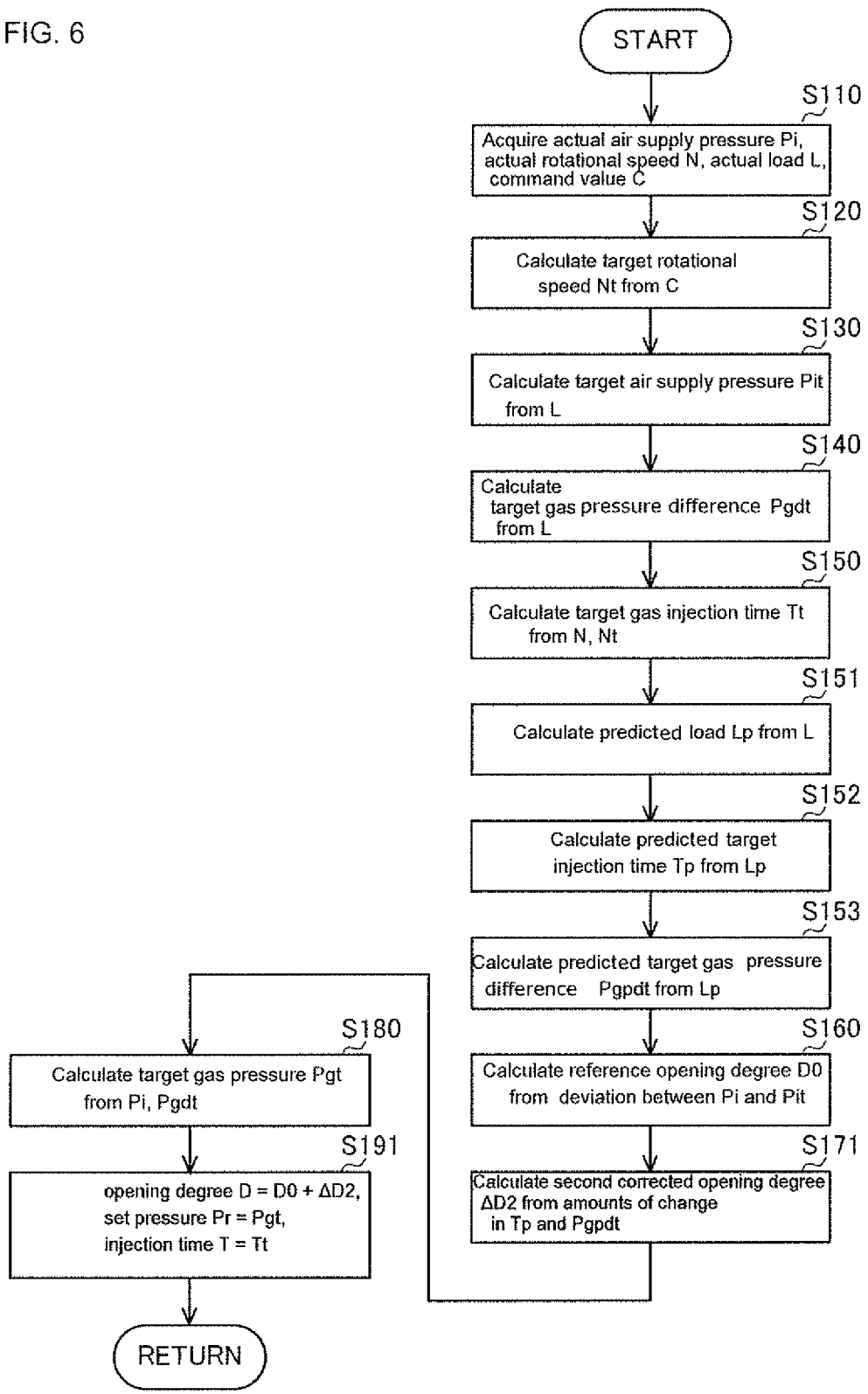
FIG. 6 is a flow chart showing the control mode of air-fuel ratio control of the gas engine according to the second embodiment of the present invention.

As shown in FIG. 5, the ECU 14 calculates the predicted load Lp from the actual load L. The ECU 14 calculates the reference opening degree D0, and at the same time, calculates a third corrected opening degree ΔD3 in view of a load fluctuation assumed after a predetermined time from the predicted target injection time Tp and the predicted target gas pressure difference Pgpdt. Then, the ECU 14 changes the opening degree D of at least either one of the air supply valve 5a or the bypass valve 5b on the basis of the reference opening degree D0 and the second corrected opening degree ΔD2.

Hereinafter, a control mode of the air-fuel ratio control by the ECU 14 will be described specifically with reference to FIG. 6.

In the step S150, the ECU 14 calculates a target gas injection time Tt from an acquired actual rotational speed N and the calculated target rotational speed Nt, and the step proceeds to the step S151.

In the step S151, the ECU 14 calculates the predicted load Lp from the acquired actual load L, and the step proceeds to the step S152.

In the step S152, the ECU 14 calculates the predicted target injection time Tp from the calculated predicted load Lp, and the step proceeds to the step S153.

In the step S153, the ECU 14 calculates and predicts the target gas pressure difference Pgpdt from the calculated and predicted load Lp, and the step proceeds to the step S160.

In the step S160, the ECU 14 calculates the reference opening degree D0 from a deviation between an acquired actual air supply pressure Pi and a calculated target air supply pressure Pit, and the step proceeds to the step S171.

In the step S171, the ECU 14 calculates the second corrected opening degree ΔD2 in view of a load fluctuation assumed after a predetermined time from amounts of change in the calculated and predicted target injection time Tp and the predicted target gas pressure difference Pgpdt, and the step proceeds to the step S180.

In the step S180, the ECU 14 calculates a target gas pressure Pgt from the acquired actual air supply pressure Pi and the calculated target gas pressure difference Pgdt, and the step proceeds to the step S191.

In the step S191, the ECU 14 changes the opening degree D of at least either one of the air supply valve 5a or the bypass valve 5b to D=D0+ΔD2 on the basis of the calculated reference opening degree D0 and the second corrected opening degree ΔD2, changes a set pressure Pr of a regulator 10 to the target gas pressure Pgt on the basis of the calculated target gas pressure Pgt, and changes an injection time T of a gas injector 8a to the target gas injection time Tt on the basis of the calculated target gas injection time Tt, and the step proceeds to the step S110.

In the gas engine 19 configured as described above, the opening degree D of the air supply valve 5a (or at least one of the air supply valve 5a and the bypass valve 5b) is changed based on the reference opening degree D0, and based on the second corrected opening degree ΔD2 in view of a load fluctuation assumed after a predetermined time from the amounts of change in the predicted target injection time Tp and the predicted target gas pressure difference Pgpdt. That is, in the gas engine 1, since the opening degree D of the air supply valve, that is, an air supply amount is corrected on the basis of the predicted target gas pressure difference Pgpdt and the predicted target injection time Tp of a fuel gas having a high response speed in view of a forthcoming load fluctuation, a response speed of the actual air supply pressure Pi further improves. Thus, it is possible to suppress a fluctuation of an actual air-fuel ratio λ associated with a fluctuation of the actual load L.

Next, a gas engine 20 that is a third embodiment of the gas engine according to the present invention will be described with reference to FIGS. 7 and 8. Note that in the following embodiment, specific description related to points similar to those in the embodiments described above will be omitted, and different points will be described mainly.

An ECU 14 can select a load fluctuation pattern from data accumulated in a certain period of an acquired actual load L, based on a load prediction map M6, and can calculate and predict the load Lp after a predetermined time, based on the selected load fluctuation pattern. Then, the ECU 14 can calculate and predict the target air supply pressure Pipt that is a corrected value of a target air supply pressure Pit by the predicted load Lp, based on a target air supply pressure map M2 and from the calculated and predicted load Lp.

Next, air-fuel ratio control by the ECU 14 of a gas engine 19 according to the present invention will be described with reference to FIGS. 7 and 8.

Figure 7:
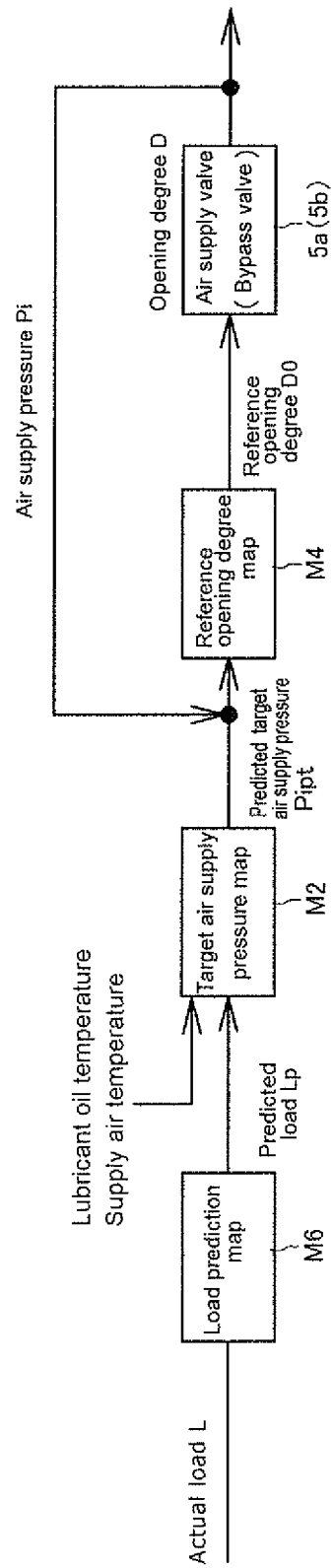
FIG. 7 is a block diagram showing a control mode of air-fuel ratio control of a gas engine according to a third embodiment of the present invention.
Figure 8:
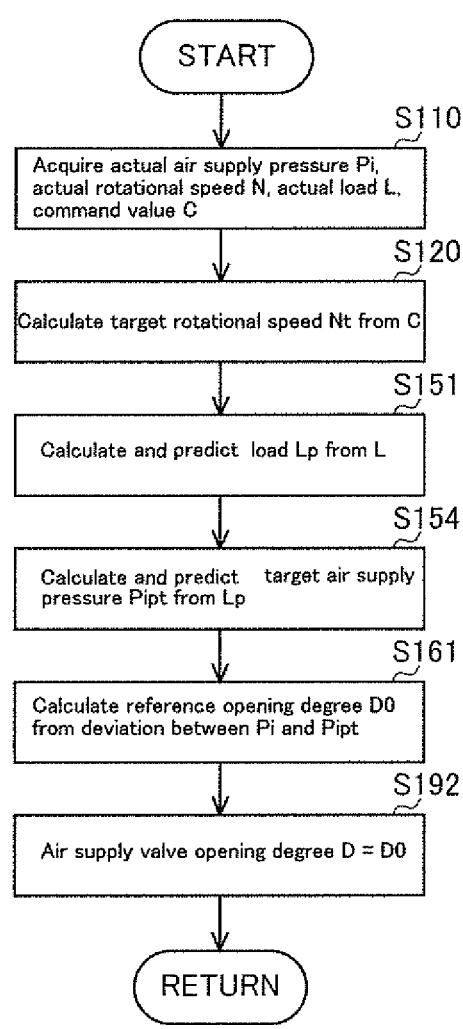
FIG. 8 is a flow chart showing the control mode of air-fuel ratio control of the gas engine according to the third embodiment of the present invention.

As shown in FIG. 7, the ECU 14 calculates the load prediction Lp from the actual load L. Next, the ECU 14 calculates the target air supply pressure Pit in view of a load fluctuation assumed after a predetermined time from the predicted load Lp. Next, the ECU 14 calculates a reference opening degree D0 in view of a load fluctuation assumed after a predetermined time from a deviation between the target air supply pressure Pit and an actual air supply pressure Pi.

Hereinafter, a control mode of the air-fuel ratio control by the ECU 14 will be described specifically with reference to FIG. 8.

In the step S120, the ECU 14 calculates a target rotational speed Nt from an acquired command value C, and the step proceeds to the step S151.

In the step S151, the ECU 14 calculates the load prediction Lp from the calculated actual load L, and the step proceeds to the step S154.

In the step S154, the ECU 14 calculates the predictable target air supply pressure Pipt from the calculated and predicted load Lp, and the step proceeds to the step S161.

In the step S161, the ECU 14 calculates the reference opening degree D0 from a deviation between the acquired actual air supply pressure Pi and the calculated and predicted target air supply pressure Pipt, and the step proceeds to the step S192.

In the step S192, the ECU 14 changes an opening degree D of an air supply valve 5a (or at least one of the air supply valve 5a and a bypass valve 5b) to D=D0 on the basis of the calculated reference opening degree D0, and the step proceeds to the step S110.

In the gas engine 20 configured as described above, the opening degree D of the air supply valve is changed based on the reference opening degree D0 calculated from the deviation between the predicted target air supply pressure Pipt in view of a load fluctuation assumed after a predetermined time from the predicted load Lp and the actual air supply pressure Pi. That is, in the gas engine 1, since the opening degree D of the air supply valve (or at least one of the air supply valve and the bypass valve 5b), that is, an air supply amount is corrected on the basis of the predicted target air supply pressure Pipt in view of a forthcoming load fluctuation, a response speed of the actual air supply pressure Pi improves. Thus, it is possible to suppress a fluctuation of an actual air-fuel ratio λ associated with a fluctuation of the actual load L.

Further, according to the present invention, the configurations of the gas engine 1 according to the first embodiment, the gas engine 19 according to the second embodiment, and the gas engine 20 according to the third embodiment are independent respectively, but each configuration may switch the control modes in the respective embodiments to one another according to load states.

The ECU of the gas engine stores the control programs and maps related to the control modes in the respective embodiments. Then, the ECU is configured to be capable of performing manual switching via an external switch, communication or the like, automatic switching in response to a detection of failure of a variety of sensors, automatic switching based on an instant error or a previous error between a load rate and a predicted load rate, and automatic switching based on position information acquired from a GPS.

INDUSTRIAL APPLICABILITY

The present invention can be applied in a variety of gas engine technologies.

DESCRIPTION OF REFERENCE SIGNS

1: Gas engine
5: Air supply valve
Pi: Actual air supply pressure
Pit: Target air supply pressure
Pgt: Target gas pressure
Tt: Target gas injection time
D: Opening degree
λt: Target air-fuel ratio Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A gas engine, wherein at least one of an opening degree of an air supply valve and an opening degree of a bypass valve is corrected so as to provide an adequate air-fuel ratio, wherein:
a target gas pressure is calculated based on an actual load,
a gas pressure is corrected based on the target gas pressure,
a predicted load after a unit time is calculated based on a load pattern in a period of time, a predicted target injection time is calculated based on the predicted load, a predicted target gas pressure difference is calculated based on the predicted load, and at least one of the opening degree of the air supply valve and the opening degree of the bypass valve is corrected based on the predicted target injection time and the predicted target gas pressure difference.

2. A gas engine, wherein:

a predicted load after a unit time is determined based on a load pattern in a period of time, a predicted target injection time is calculated based on the predicted load, and at least one of an opening degree of an air supply valve and an opening degree of a bypass valve is adjusted, based on the predicted target injection time, to correct one of a target air supply pressure and a target air-fuel ratio.

3. The gas engine, according to claim 1, wherein:

the at least one of the opening degree of the air supply valve and the opening degree of the bypass valve is corrected based on one of a pressure differential between a target air supply pressure and an actual air supply pressure, and a difference between a target air-fuel ratio and an actual air-fuel ratio.

4. The gas engine, according to claim 2, wherein:

the at least one of the opening degree of the air supply valve and the opening degree of the bypass valve is corrected based on a pressure differential between the target air supply pressure and an actual air supply pressure.

5. The gas engine, according to claim 2, wherein:

a predicted target gas pressure difference is calculated based on the predicted load, and the at least one of the opening degree of the air supply valve and the opening degree of the bypass valve is corrected further based on the predicted target gas pressure difference.

6. The gas engine, according to claim 4, wherein:

the at least one of the opening degree of the air supply valve and the opening degree of the bypass valve is corrected further based on a difference between the target air-fuel ratio and an actual air-fuel ratio.

7. A gas engine comprising:

an air supply manifold;

a valve configured to control an amount of air supplied to the air supply manifold; and a controller coupled to the valve, the controller configured to:
  determine, based on a load pattern in a period of time, a predicted load;
  calculate, based on the predicted load, a predicted target gas injection time and a predicted target gas pressure difference;
  calculate a reference opening degree of the valve;
  calculate a corrected opening degree based on a change in the predicted target gas injection time, a change in the predicted target gas pressure difference, or both; and
  adjust an opening degree of the valve based on the reference opening degree and the corrected opening degree.

8. The gas engine of claim 7, further comprising:

a supercharger including a compressor unit and a turbine unit, the compressor unit coupled to the turbine unit via a connecting shaft of the supercharger; and an intercooler; and wherein the valve comprises an air supply valve, the air supply valve coupled to an outlet of the supercharger and to an inlet of the air supply manifold via the intercooler.

9. The gas engine of claim 7, further comprising:

a supercharger including a compressor unit and a turbine unit, the compressor unit coupled to the turbine unit via a connecting shaft of the supercharger; and an intercooler; and wherein the valve comprises a bypass valve, the bypass valve coupled to an air intake and to an inlet of the air supply manifold via an inlet of the intercooler.

10. The gas engine of claim 7, wherein:

the controller is configured to calculate the corrected opening degree based on the change in the predicted target gas pressure difference.

11. The gas engine of claim 7, wherein:

the controller is configured to calculate the corrected opening degree based on the change in the predicted target gas injection time.

12. The gas engine of claim 7, wherein:

the controller is configured to:
  calculate a predict target air supply pressure from the predicted load; and
  calculate the reference opening degree based on the predicted target air supply pressure.

13. The gas engine of claim 7, wherein:

the controller is configured to select, based on a calculated target rotational speed and a calculated actual load, a load fluctuation pattern from a plurality of load fluctuation patters; and the controller is further configured to determine the predicted load based on the load pattern using the load fluctuation pattern.

14. The gas engine of claim 13, wherein:

the controller is configured to calculate the reference opening degree further based on a deviation of an air supply pressure.

15. The gas engine of claim 13, further comprising:

a regulator configured to control a gas fuel pressure; and wherein the controller is configured to cause the regulator to set a pressure to the predicted target gas pressure difference.

16. The gas engine of claim 7, wherein:

the controller is configured to calculate the reference opening degree based on a deviation of an air supply pressure.

17. The gas engine of claim 16, wherein:

the controller is configured to calculate the reference opening degree further based on a target air supply pressure.

* * * * *